W. FULTON.

Lamp Burner.

No. 810. Reissued Sept. 13, 1859.

N. PETERS. Photo-Lithographer. Washington, D. C.

UNITED STATES PATENT OFFICE.

WILLIAM FULTON, OF CRANBERRY, NEW JERSEY.

IMPROVEMENT IN LAMPS.

Specification forming part of Letters Patent No. 21,069, dated August 3, 1858; Reissue No. 810, dated September 13, 1859.

*To all whom it may concern:*

Be it known that I, WILLIAM FULTON, of Cranberry, in the county of Middlesex and State of New Jersey, have invented a new and Improved Lamp-Burner; and I do hereby declare that the following is a full, clear, and exact description of the same, reference being had to the accompanying drawings, and to the letters of reference marked thereon, making a part of this specification, in which—

Figure 1:
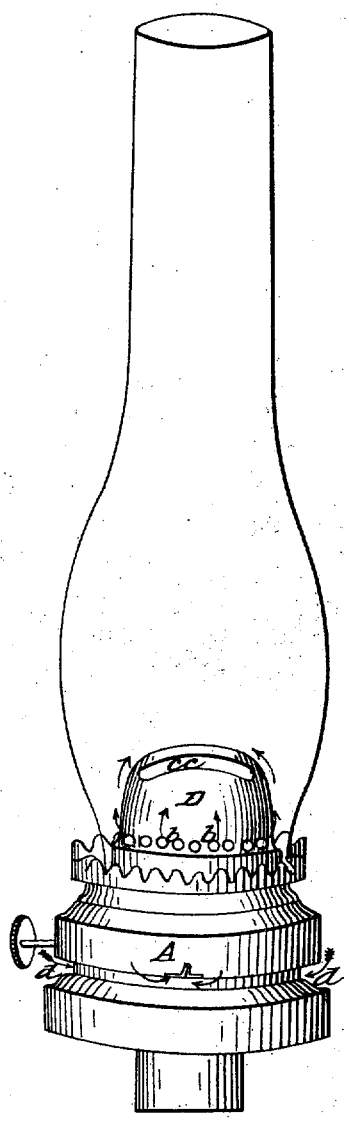
Figure 4:
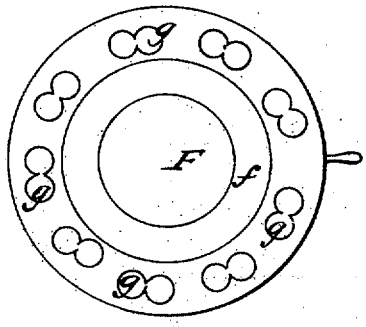
Figure 3:
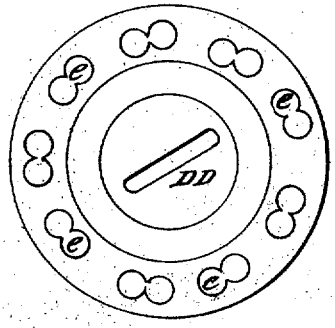
Figure 2:
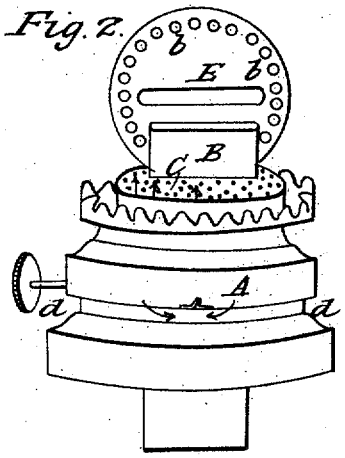

Figure 1 is an external view of my invention with the glass chimney applied to it. Fig. 2 is also an external view, with the the cap raised so as to expose the wick tube and the perforated plate or air-distributer C. Fig. 3 is an inverted plan of my invention, showing the stationary portion of the register. Fig. 4 is a detached view of the movable plate of the register.

Similar letters of reference indicate corresponding parts in the several figures.

This invention relates to an improvement in lamps for burning coal-oils and other substances that are rich in carbon, and which require a considerable amount of oxygen to support a proper combustion for illuminating purposes.

The object of the invention is to adapt a lamp for burning equally well all the different substances above named, however much they may vary as regards the proportion of carbon they possess. This object is attained by applying a register to the bottom of the burner, and using in connection therewith a perforated. plate or gauze-wire, as shown in Fig. 2. On the ring above the perforated plate or gauze-wire rests a cap, D, as shown in Fig. 1, around the bottom of which a row of holes are made, serving to keep the chimney cool and helping to support combustion, the parts being so arranged that a greater or less amount of oxygen is admitted to the flame, according to the amount of carbon the burning material possesses, a complete combustion of its elements being thereby effected, and a flame of the greatest illuminating power obtained.

To enable those skilled in the art to fully understand and construct my invention, I will proceed to describe it.

A represents the top of a lamp, which is fitted on a reservoir or fountain of the usual or any proper form. This top is constructed of sheet metal, any of the ordinary materials being use.

B is the wick-tube, which is of oblong form, to receive what is generally known as the "flat-wick." This wick-tube, instead of passing through a solid metal plate, as usual, passes through a perforated plate or gauze-wire, C, which is plainly shown in Fig. 2. Cap D shuts down over it, as shown in Fig. 1, the tube coming within half an inch of the top of the cone. The perforated plate C does not afford a communication with the reservoir below, and the flame, for a plate, D D, (see Fig. 3,) closes the lower end of the cap, the tube-wick passing through said plate. (See Fig. 3.) On the upper part of the top A a cap, D, is placed and attached by a hinge or joint, so that it may readily turn back to fully expose the wick-tube, as shown at E in Fig. 2, or turn forward, so as to to cover it, as shown at D in Fig. 1. Through the lower part of the cap D openings *b* are made, said openings extending all around the cap, and an oblong slot, *c c*, is made through the top of the cap. The external air passes through the bottom D D at *e*, and through the regulator F, as shown at Fig, 4, and then passes through the perforated plate or air-distributer C, as shown at Fig. 2. The air then passes through the openings *b* in the lower part of the cap D, so as to keep the chimney cool and help to support combustion, the remainder passing through the slot *c c*. Within the top A, and just above or over the perforated portion *e*, a perforated plate, *f*, is placed, as shown in Fig. 4. This plate is allowed to turn within the top A, and its holes *g* are made to wholly or partially register with the openings *e*. The perforated plate *f* and perforated portion of the top form a register to regulate the admission of air to the flame, the external air passing in the bottom D D at *e*, as shown in Fig. 3, or as indicated by the arrows in Fig. 1, and so on through the openings *g* in Fig. 4, and then passes through the perforated plate or air-distributer C, Fig. 2, and through the holes *b* in the bottom of the cap D, the remainder passing the slot *c c*. The perforated plate C serves to distribute the air evenly in the top of the cap D. The holes *b* in the lower part of the cap serve to keep the chimney cool and present the air evenly to the flame. By this invention more or less air may be admitted to the flame, as may be desired. If the material to be burnt is very rich in carbon—as camphene for instance, or rosin-oil—the register is left entirely open. If coal-oils are used the register is turned to reduce the volume of air which is admitted to the flame, as the latter material contains less carbon than the former, and if a mixture of coal and whale oils are used, a mixture containing still less carbon, the register may be turned to still further reduce the volume of air. The plate C, Fig. 2, adds greatly to the efficiency of the device, it having a tendency to equailze the draft, causing it to impinge upon the flame all around with equal intensity. Without the perforated plate C, or its equivalent, it is impossible to obtain a perfect combustion from a large-sized burner. The perforations *b* in the lower part of the cap D admit a current of air each side of the cap, as indicated by the arrows. This invention is important, for many burning materials are now sold which differ only in the amount of carbon they contain, and which can only be perfectly consumed by a proper admission of air to them. Articles of the same name—as coal-oil, for instance—frequently differ in this respect, and hence a perfect or good illuminating-flame has not hitherto been obtained at all times.

I am fully aware that perforated tin and gauze-wire have been used in miner's lanterns, and that holes have been used in the caps of camphene-lamps for round wicks, many years ago, but I am not aware that they have ever been used in connection for the purpose set forth, prior to my invention for flat-wick lamps.

Having thus described my invention, what I claim as new, and desire to secure by Letters Patent, is—

1. The perforated plate or air-distributer C, or its equivalent, as shown in Fig. 2, for the purpose of regulating the elastic force of the air so that it may be presented evenly to the flame when applied to flat-wick lamps, it being placed horizontal.

2. The perforations *b* in the lower part of the cap D, as shown at Fig. 1, in combination with the perforated or air-distributing plate C, as shown in Fig. 2.

3. The register formed of the perforation *e* in the top A, as shown in Fig. 3, in combination with the perforated plate or air distributer C, as shown in Fig. 2, and the holes *b* in the lower part of the cap D, as shown in Fig. 1, the whole being arranged substantially as and for the purpose described.

WILLIAM FULTON.

Witnesses:

ISAAC VAN NORSTRAND,
ROBERT SHEPHERD.